United States Patent [19]

Genevey et al.

[11] 4,150,693

[45] Apr. 24, 1979

[54] ADJUSTABLE LOSS-OF-HEAD VALVE

[75] Inventors: Jacques Genevey, Echirolles; Jean Vincendon, Grenoble, both of France

[73] Assignee: Alsthom-Atlantique, Paris, France

[21] Appl. No.: 798,559

[22] Filed: May 19, 1977

[30] Foreign Application Priority Data

Jun. 14, 1976 [FR] France .................. 76 17956

[51] Int. Cl.² .............................. F16K 3/32
[52] U.S. Cl. .................... 137/625.3; 137/625.33; 251/328
[58] Field of Search ............ 137/625.3, 625.33; 251/326, 328

[56] References Cited

U.S. PATENT DOCUMENTS

| 2,443,071 | 6/1948 | Honerkamp et al. ............. 137/625.3 |
| 3,183,926 | 5/1965 | Boudot ............................. 251/326 X |
| 3,203,442 | 8/1965 | Grove ............................. 251/328 X |
| 3,463,193 | 8/1969 | Yost ................................. 251/326 X |
| 3,517,697 | 6/1970 | Hott, Jr. et al. ................ 137/625.33 |
| 3,955,591 | 5/1976 | Baumann ....................... 137/625.3 X |

*Primary Examiner*—Arnold Rosenthal
*Attorney, Agent, or Firm*—Sughrue, Rothwell, Mion, Zinn and Macpeak

[57] ABSTRACT

An adjustable loss-of-head valve with a mobile perforated plate sliding on a stationary perforated plate, constituted by an annular one-piece body comprising an annular constriction on the upstream side with an annular recess immediately downstream from said constriction and in which a mobile perforated plate moves, a stationary perforated plate being disposed in the downstream part of this recess, the assembly formed by the body and the stationary plate being clamped between two flanges of a pipe on which said loss-of-head valve is placed.

1 Claim, 3 Drawing Figures

ADJUSTABLE LOSS-OF-HEAD VALVE

FIELD OF THE INVENTION

The present invention relates to a valve for providing an adjustable loss of head by means of a mobile perforated plate which slides over a stationary perforated plate. The valve is intended to be placed, in particular, in a pipe.

SUMMARY OF THE INVENTION

The present invention provides an adjustable loss-of-head valve comprising a mobile perforated plate mounted to slide over a stationary perforated plate and arranged for fitting in a liquid guiding bore. The valve is constituted by a single-piece annular body comprising an annular constriction for installation on the upstream side with an annular recess immediately downstream from said constriction and in which the mobile perforated plate moves. The stationary perforated plate is disposed in the downstream part of the recess and bears against a shoulder thereof. The mobile plate slides between the downstream part of the annular constriction and the stationary plate. The assembly formed by the body and the stationary plate is clamped between two flanges of a pipe on which said loss-of-head valve is placed and control means are fixed on the body of the valve to move the mobile plate.

Such a structure has the advantage of having a one-piece body which can be moulded or machined in a single piece and the assembling of the assembly of the valve as well as its installation on a pipe by clamping flanges makes it possible to constitute the valve by means of simple parts without bolts or nuts.

An embodiment of the invention is described hereinbelow by way of example with reference to the accompanying drawings.

DESCRIPTION OF THE PREFERRED EMBODIMENT

Figure 1:
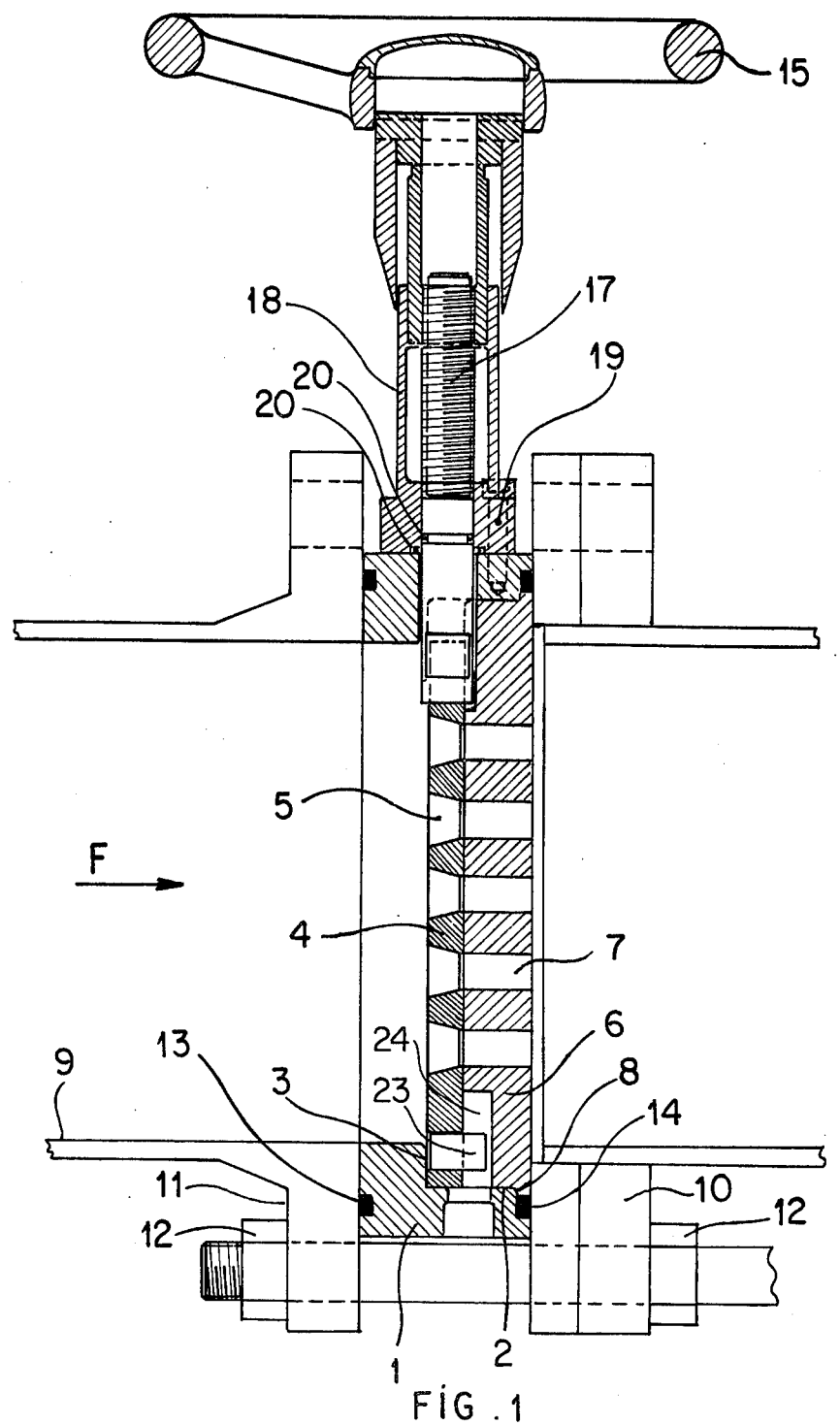
FIG. 1 is a cross-section of a loss-of-head valve through the line I—I of FIG. 2.

FIG. 1 shows annular body 1 of an adjustable loss-of-head valve comprising an annular recess 2 in its downstream part and an annular constriction 3 on its upstream side forming a lip.

A mobile plate 4 of the valve is pierced with loss of head orifices 5 and is placed in the recess 2 against the lip 3 and against a stationary plate 6. The stationary plate 6 is also pierced with loss of head orifices 7 which can be blocked and it is disposed in the recess 2 with a portion disposed against a shoulder 8.

The assembly is assembled and at the same time it is inserted in a pipe 9 by clamping it between two flanges 10 and 11 of the pipe, this clamping being effected by bolts 12.

Seal rings 13 and 14 are provided on body 1.

The mobile plate can move and slide between the stationary plate 6 and the lip 3 so as to block the orifices 7 partially or completely, thus adjusting the degree of loss of head produced by the valve in the flow in the pipe 9 which is in the direction of the arrow F.

Figure 2:
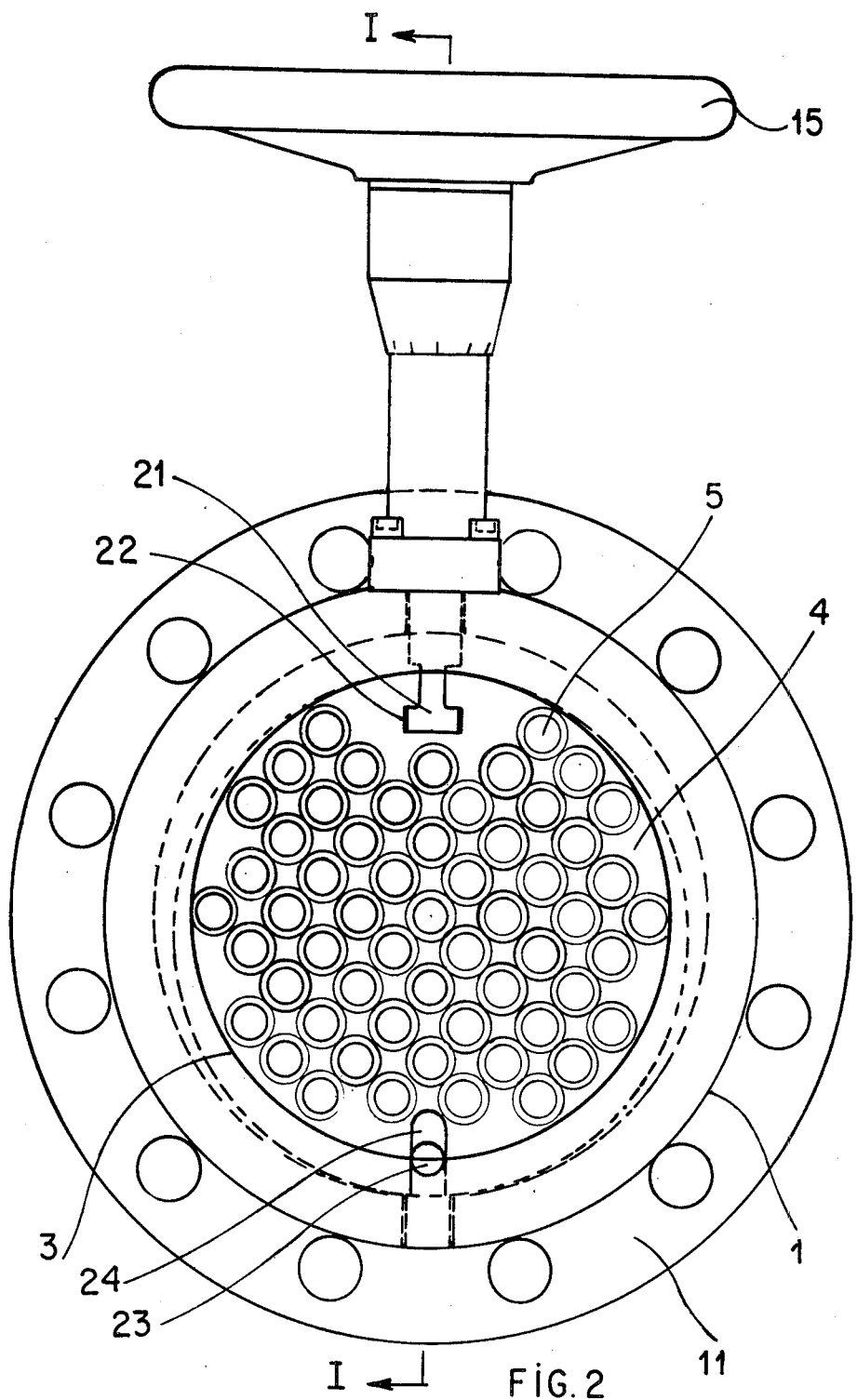
FIG. 2 is elevation of the valve in the fully open position.
Figure 3:
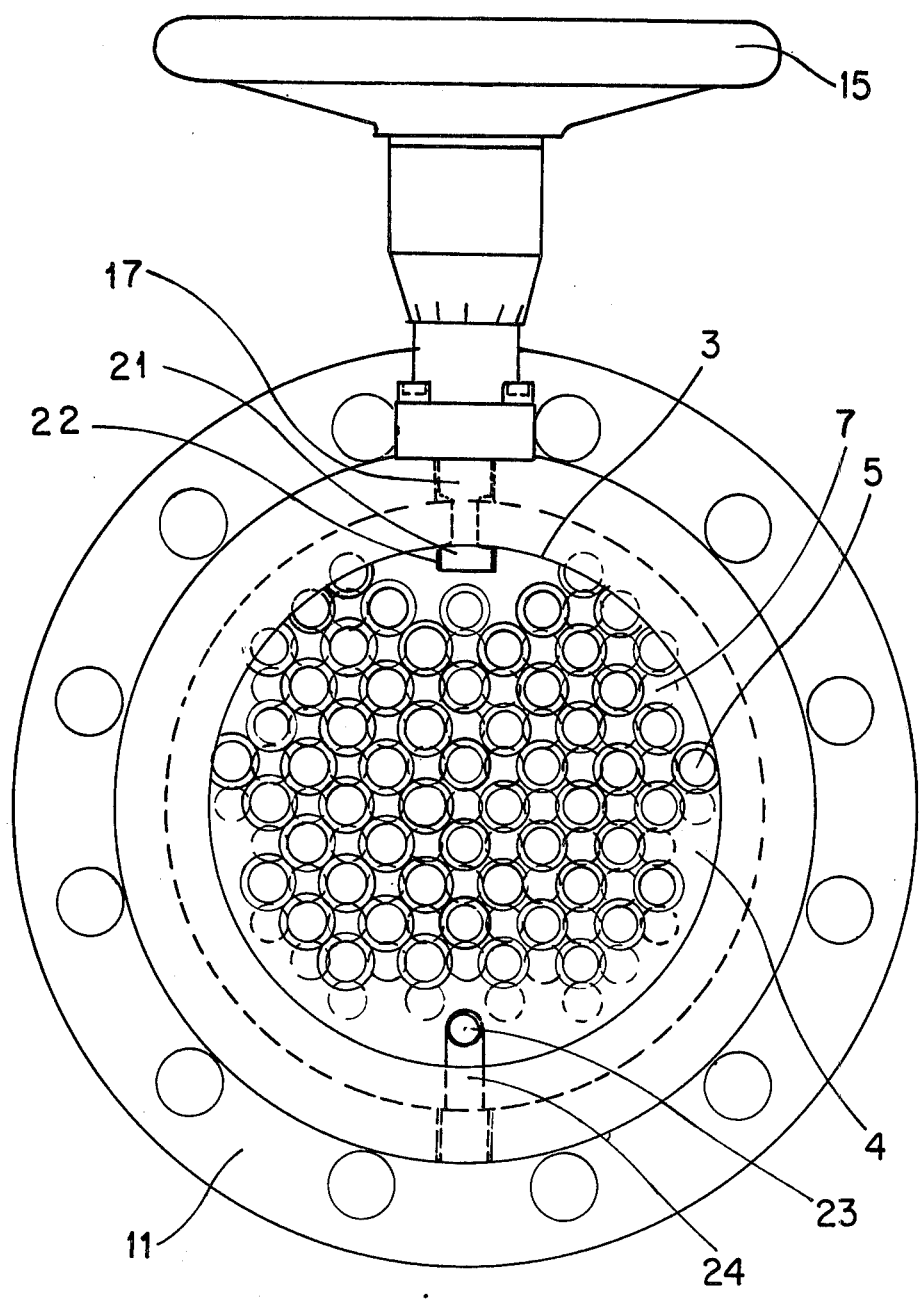
FIG. 3 is an elevation of the valve in the fully closed position.

FIG. 2 shows the mobile plate 4 in the open position, i.e. in the minimum loss of head position and FIG. 3 shows this plate in the maximum loss of head position, i.e. in the closed position. All the intermediate positions between these two end positions blocking the orifices 7 allow the loss of head to be adjusted partially as required.

The mobile 4 plate is moved between these two end positions by means of a hand wheel 15 whose rotation turns a threaded rod 17 which is guided in a housing 18 fixed on the body 1 by means of screws 19, seal rings 20 being provided on rod 17.

The mobile plate 4 is connected to the rod 17 by means of a protrusion 21 in a recess 22 of the plate 4 when the housing 18 is installed on the body 1.

The mobile plate 4 is guided in its movement by a stud 23 which slides in a slot 24 in this plate.

What we claim is:

1. An adjustable loss-of-head valve for clamping between two opposed flanges of a pipe, said valve comprising: an annular body of a diameter permitting said body to be clamped between said pipe flanges, an annular recess on the inner periphery and to one side of said annular body and defining a upstream annular constriction and forming a first radial shoulder and wherein said annular recess includes a radially projecting portion on the downstream side of said annular body and forming a second radial shoulder downstream of said first shoulder, a stationary perforated plate having a diameter in excess of the internal diameter of said annular constriction and positioned within said recess and having a radially projecting portion in abutment with said second shoulder such that the upstream end thereof is spaced axially from said first shoulder, a mobile perforated plate having a diameter less than the diameter of the recess but greater than the diameter of the annular constriction, slidably mounted upstream of said stationary perforated plate within said recess between said annular constriction and said stationary plate with its peripheral edge facing said first shoulder and means for clamping said annular body between said opposed pipe flanges and said radially projecting portion of said stationary perforated plate against said second shoulder, and control means mounted on said annular body for moving said mobile plate transversely to the axis of said annular body to vary the perforations of one plate with respect to the other, and wherein said annular recess radially projecting portion on the downstream side of said annular body and forming said second radial shoulder is of a radial depth in excess of the diameter of said radially projecting portion of said stationary perforated plate to define an annular seal ring recess between an opposed pipe flange and said single piece annular body, and an annular seal ring within said annular seal ring recess.

\* \* \* \* \*